(12) United States Patent
Liang

(10) Patent No.: US 7,308,493 B2
(45) Date of Patent: Dec. 11, 2007

(54) TASK-BASED AUTOMATIC NETWORK MANAGEMENT SYSTEM WITH DISTRIBUTED CONTROL AND MANAGEMENT INFORMATION BASE

(75) Inventor: Yung Chang Liang, Taipei (TW)

(73) Assignee: Trend Micro Incorporated, Cupertino, CA (US)

( * ) Notice: Subject to any disclaimer, the term of this patent is extended or adjusted under 35 U.S.C. 154(b) by 917 days.

(21) Appl. No.: 10/161,749

(22) Filed: Jun. 5, 2002

(65) Prior Publication Data
US 2003/0229688 A1    Dec. 11, 2003

(51) Int. Cl.
*G06F 13/00* (2006.01)
(52) U.S. Cl. ....................................... 709/223
(58) Field of Classification Search ............. None
See application file for complete search history.

(56) References Cited

U.S. PATENT DOCUMENTS 6,404,743 B1 * 6/2002 Meandzija ................. 370/254

2002/0085571 A1 * 7/2002 Meandzija ................. 370/410

* cited by examiner

*Primary Examiner*—Robert B. Harrell
(74) *Attorney, Agent, or Firm*—Beyer Weaver LLP

(57) ABSTRACT

The invention provides a network automatic management method and a corresponding system for executing the method. The system according to the invention comprises a management server connected to a plurality of devices nodes, a management information database (MIB) connected to the management server system; an plurality of event tables stored in the MIB, each corresponding to an event that occurred in the network system and having a task leader selection base for selecting task leaders from at least one of the device nodes for performing a task. Work to be executed in a network is realized by a task which is a work package for indicating devices in the lower layers of the network system to execute work assigned by the management server. At least one task leader is assigned in the system for executing work performed by the management server in optimally reducing the burden thereof.

38 Claims, 7 Drawing Sheets

TASK-BASED AUTOMATIC NETWORK MANAGEMENT SYSTEM WITH DISTRIBUTED CONTROL AND MANAGEMENT INFORMATION BASE

FIELD OF THE INVENTION

The invention generally relates to network management and more particularly, to an automatic network management system with distributed management operations among several task leaders.

BACKGROUND OF THE INVENTION

Generally, a network management system collects management information from each network equipment in a network and stores the collected management information for managing the network. Information required for network management including the collected management information is displayed by the network management system.

As the performance of personal computers and workstations is enhanced, a plurality of computers can be connected through a local area network (LAN) to construct a network system. Through a LAN, various types of operating systems are provided on computers functioning as clients or servers which are connected through the network to operate in a cooperative manner.

In such a network system, as the scale thereof expands, the number of computers functioning as clients and servers extends to several hundreds or even to several thousands. When the network manages and operates the respective computers as their numbers increase, the loads of the system operators and the cost accordingly increase. In order to solve such scalability problems, a management system has been proposed in which a manager tool is provided on at least one of the servers on the LAN. An agent for managing each computer is also provided in accordance with directions from the manager tool in each of the servers connected to the LAN. In this manner, central management is achieved by the manager tool through the network. In particular, when a system performing an essential business function of an enterprise is to be constructed, a management system focused on fault management of the server is provided.

In general, a network system is divided into hierarchies such as those defined by geographical classification, management classification and detailed information being displayed in the form of a map having a plurality of hierarchical levels. These hierarchies are defined and implemented so that the configuration of a large-scale complex network can readily be identified. However, a conventional network management system requires a human operator to command the system for executing the management operations. As most of the management operations are performed in the console of the system manager, thousands to tens of thousands of computers under the control of the network system. The system manager commands the computers by entering a series of instructions which are then sent to the device nodes necessary to perform the management operations under the control of the system console. As a result, the system manager is required to perform a tedious operation process with a burdensome load of plural instructions. Furthermore, since most of the management operations are performed in the console of the system manager, the calculation load is unbearably high, resulting in a long wait time before proceeding from one instruction to the next. The total operation time is consequently very long, where the system manager idles for a long time in waiting for the operation results.

SUMMARY OF THE INVENTION

Accordingly, the invention provides a network automatic management system, wherein work to be executed in a network is realized by a task which is a work package for instructing a plurality of devices in the lower layers of a network to execute work assigned by the management server. The task is an instruction set including a plurality of instructions (or cures) for automatically performing an operation without the need to enter into the instructions one by one through the network managers.

The present invention further provides a network automatic management system, wherein at least one task leader is assigned in the system for executing the work performed by the management server in order to optimally reduce the burden of the management server. The network system can assign a plurality of task leaders to perform the management work that is otherwise executed by the management server. The time period for an operation in the network system is advantageously reduced, and consequently the burden of the management server is reduced.

According to a preferred embodiment, the invention provides an automatic network management system comprising a management server being connected to a plurality of devices nodes, a management information database (MIB) being connected to the management server system, and a plurality of event tables stored in the MIB, each of the event tables corresponding to an event that occurred in the network management system and having an event condition list registering conditions about the event, and a task leader selection base for selecting task leaders from at least one of the device nodes for performing a task. Work to be executed in a network is realized by a task which is a work package for indicating devices in the lower layers of the network system to execute work assigned by the management server. At least one task leader is assigned in the system for executing work performed by the management server in optimally reducing the burden thereof.

Moreover, the present invention provides a process for automatically managing a network system. A preferred embodiment of the process according to the invention comprises the following steps. A management server first finds a task in response to one induced event in the network system. The management server then determines at least one task leader including other lower layer task leaders. The at least one task leader receives respective control tasks and then builds task coverages having a plurality of device nodes according to the control tasks. The management server sends an executing task to the task leaders. The task leader receives an executing task and then delivers the executing task to the device nodes in the corresponding task coverage. The device nodes within the task coverage perform operations instructed by the executing task and then send operation results to the task leader. The task leader summarizes and operates on the results according to the corresponding control task and in turn sends final results to the management server.

BRIEF DESCRIPTION OF THE DRAWINGS

The various tentures and advantages of the present invention will be more readily understood by reading the following detailed description in conjunction with the appended drawings (not necessarily drawn to scale), in which:

FIGS. 5 and 5A are flow diagrams illustrating a preferred embodiment of the process according to the invention.

DETAILED DESCRIPTION OF PREFERRED EMBODIMENTS

Figure 1:
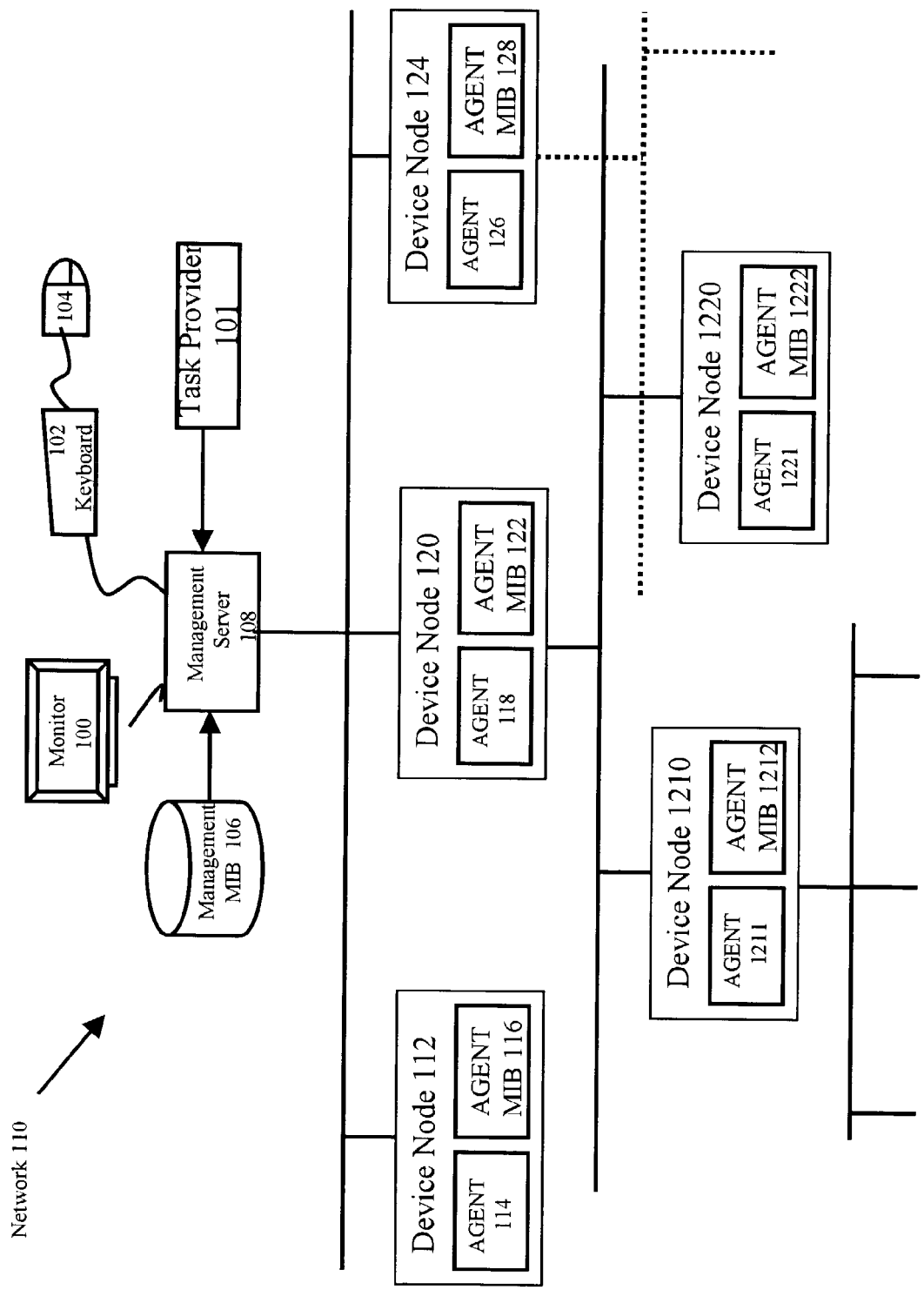
FIG. 1 is a diagram illustrating a general network structure for the automatic network management system according to a preferred embodiment of the invention.

FIG. 1 is a block diagram of a distributed network management system on which an exemplary network management system constructed according to the invention can operate. As shown, the system is a distributed computing environment comprising a plurality of individual nodes 108, 112, 120, 124, 1210 and 1220. The nodes are functionally organized into device nodes 112, 120, 124, 1210 and 1220 and at least one management server 108 interconnected over a network 110. The device nodes 112, 120, 124, 1210 and 1220 and management server 108 can also be implemented on a single computer system. The management server 108 is a general-purpose computer which includes user interfacing devices, such as a monitor 100, keyboard 102 and mouse 104. In the described preferred embodiment according to the invention, each management server 108 is a network-connectable computer or a server device, such as a Sun Sparc-Station™ workstation running the Solaris™ operating system, UNIX® operating system, or an IBM-compatible computer running the Windows NT™ operating system. However, the use of the systems and processes described and suggested herein are not limited to a particular computer configuration. The management server 108 also includes a management information database (MIB) 106, such as a relational database, file system or other organized data storage system that stores management information.

It should be noted that in FIG. 1, some network devices, such as routers, gateways and adapters are not illustrated although they are necessary devices in running a network. However, the omission of these devices from FIG. 1 will not adversely affect the operative results of the invention. Those skilled in the art can assume that the required network devices have been located in the required wire connections of the network. Moreover, the management server 108 can be connected to a task provider 101.

Each device node (112, 120, 124, 1210 and 1220) corresponds to a managed device which might, for example, be a processor, a notebook computer, a desktop computer, or a workstation or other network apparatus. The state of each managed device is monitored and controlled by an agent program running in the node. For example, agent programs 114, 118, 128, 1211 and 1212 run in device nodes 112, 120, 124, 1210, 1220, respectively. Each agent may also have a local management information database (116, 122, 126, 1212, 1222, respectively) that stores status information and parameters for the managed device (namely, an agent MIB). The agents can be preinstalled in each device node, or are generated by the management server 108. In operation, a management application program running in the manager node 108 cooperates with the agents 114, 118, 128, 1211 and 1212 to manage the network. The management server 108 can download information from the agents 114, 118, 126, 1211, 1221 or from their associated databases 116, 122, 126, 1212, 1222. The manager node 108 can also set parameters in the devices by instructing the agent programs to set parameters and values within the devices or their drivers.

Generally, a network is divided into hierarchies such as those defined by geographical classification, management classification and detailed information being displayed in the form of a map having a plurality of hierarchical levels. These hierarchies are defined and implemented so that the configuration of a large-scale complex network can be readily identified. The device nodes (112, 120, and 124) comprise a first layer of the network. The network can also be a multiple-layer network, including first layers, second layer, third layer, etc. As illustrated in FIG. 1, a second layer sub-network is shown, including device nodes 1210 and 1220. The device node 1210 includes an agent 1211 and an agent MIB 1212. The device node 1220 includes an agent 1221 and an agent MIB 1222.

Figure 2:
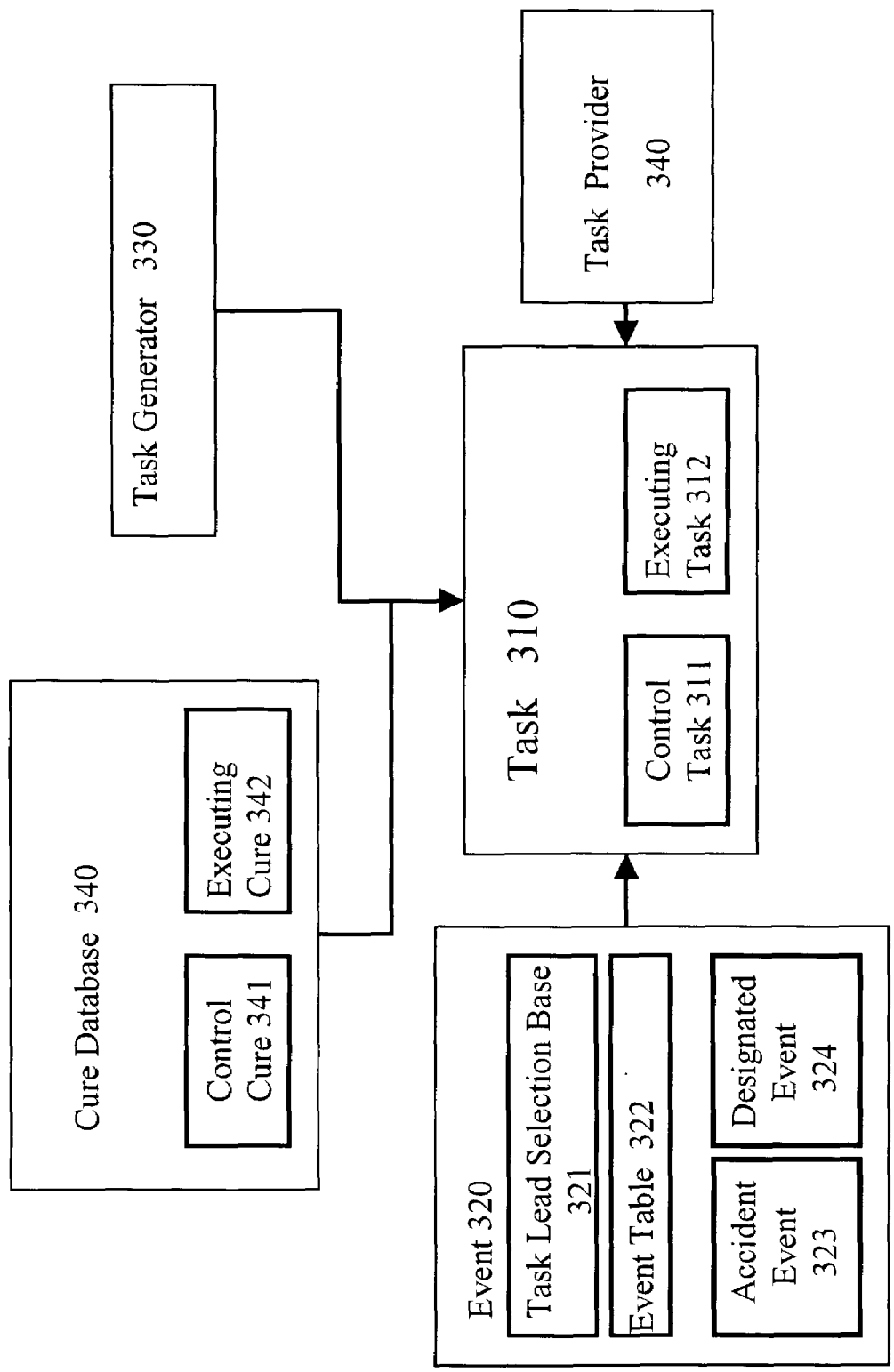
FIG. 2 is a schematic view illustrating an exemplary data structure for the automatic network management system according to the invention.

At first the MIB 106 is a library which store the tasksin the network system. A task is a series of operation steps so as to complete work to performed in the network. For example, the task may include scanning computer viruses, determining the network hierarchies, gathering network data, managing network directories, collecting user suggestions, etc. A task includes at least one cure. For example, a task for scanning viruses may contain the cures of finding location of the virus, reporting the virus position, reporting the number of the viruses captured, etc. Moreover, a task is event-based. An event in the network induces and triggers a task to be performed which produces a result. FIG. 2 is a schematic view illustrating an exemplary data structure for network management according to the invention. Cures and events will be described hereinafter in further detail.

Referring to FIG. 2, events are divided into accident events 323 and designated event 324. The accident events 323 are events induced from the downstream device nodes, such as an event of virus infection which is a response from the infected device nodes. The designated events are events that are manually designated or designated from the service provider 101. Designated events include an event of collecting accounting data or collecting personal profiles, etc. Such designated events are called operator designated events which are designated in a predetermined workflow.

An event corresponds to an event table 322 that defines the conditions of the event and the corresponding task(s) for the event. For example, for a virus scan event, the conditions of the event can include finding abnormality in the system, scanning for computer viruses according to a preset table, etc. These events are listed in the event table for computer viruses.

Figure 3:
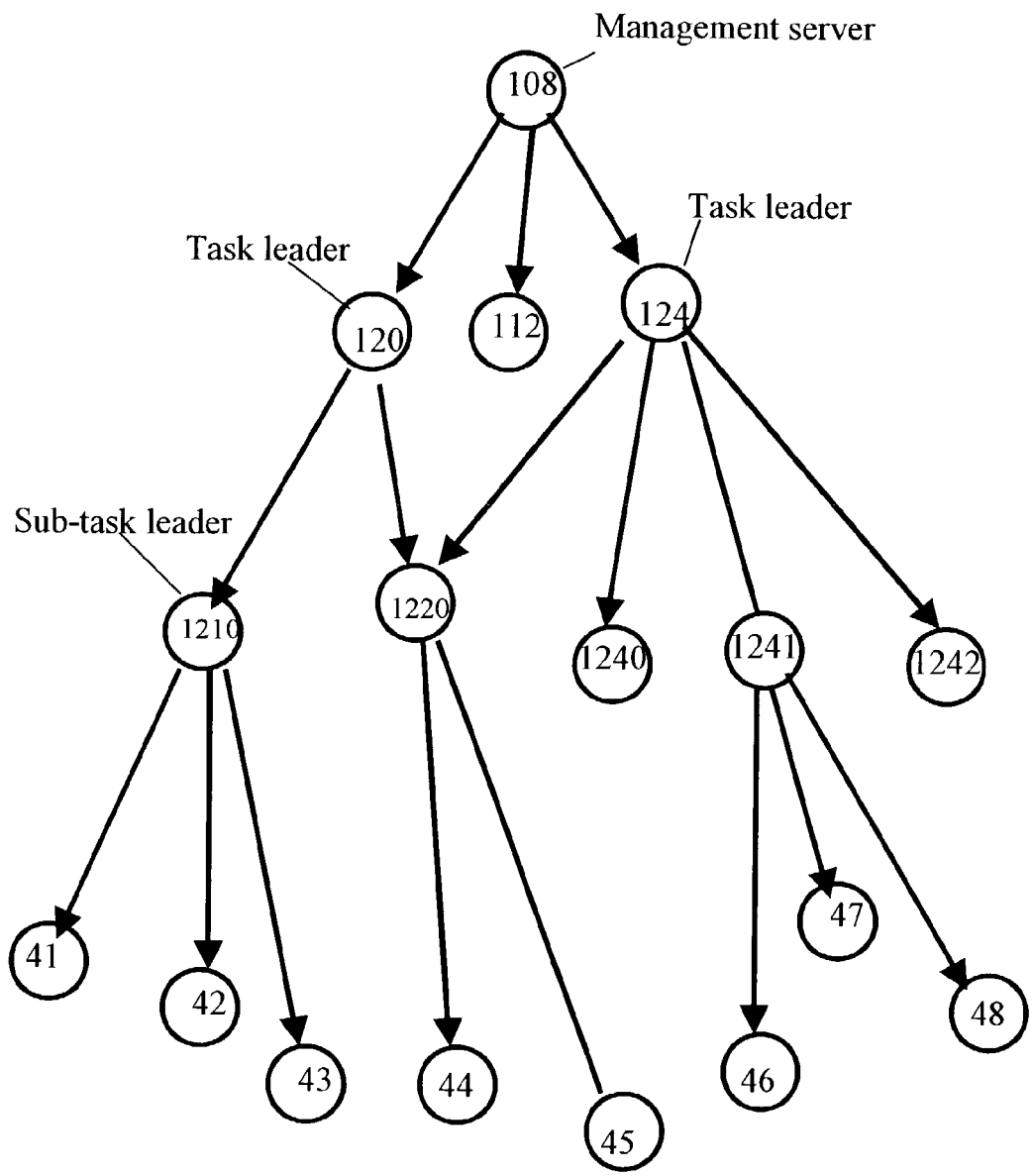
FIG. 3 is a schematic view illustrating an exemplary connection of a plurality of multi-layer device nodes according to an embodiment of the network architecture of the invention.

FIG. 3 is a schematic view illustrating an exemplary connection of a plurality of multi-layer device nodes according to an embodiment of the network architecture according to the invention. In general, a system includes hundreds to thousands of device nodes. If a task is completely managed by the management device 108, it is likely that the load is too cumbersome to be performed efficiently. The system according to the invention can advantageously select one or more task leaders to perform some of the management work for the management server 108. An arrangement of a network is illustrated in FIG. 3. In FIG. 3, it is shown that the management server 108 is at the top layer of the network structure. At the first layer of the network, there are three device nodes 120, 112 and 124. The second layer of the network includes device nodes 1210, 1220, 1240, 1241 and 1242. The device nodes 41, 42, 43, 44, 45, 46, 47 and 48 are arranged at the third layer of the network. In this particular embodiment of the invention, the device nodes 120 and 124 are assigned as a task leader by the management server 108 based on a task to be performed. If the network system so requires, the task leader can further assign sub-task leaders. For example, in the embodiment of the network architecture illustrated in FIG. 3, the device node 1210 is designated as a sub-task leader. The sub-task leaders perform at least one task assigned by the task leader, or execute the same tasks as those performed in the task leader so as to reduce the burden of the task leader. Similarly, there may be some other device nodes assigned as task leaders. Further orders of task leaders, such as sub-sub task leaders, can be designated as required in accordance with further embodiments of the invention.

In the automatic network management system according to the invention, the management applications can advantageously access management information located in the management information database (MIB 106). The management server 108 interacts with the agents associated with the managed objects 112, 120, etc. These agents are typically located in the device nodes and can communicate with the management server 108 by means of a variety of protocols (such as SNMP and CMIP). In particular, the management server 108 can operate with separate protocols by means of management protocol adapters (not shown). For example, management server 108 can communicate with an SNMP agent, for example, located in the device node 112, by means of an SNMP protocol adapter (not shown). Similarly, management server 108 can communicate with a SunNet™ manager (SNM) agent, for example, located in device node 120, by means of an SNM protocol adapter (not shown). Management server 108 can also communicate with a CMIP agent, for example, the device node 124, by means of a CMIP protocol adapter (not shown).

The configuration in the designation of task leaders according to the invention, illustrated in FIG. 3, allows separate management applications. For example, the system may designate two task leaders of device nodes 120 and 124 for performing two different tasks in the same time frame. That is, the device node 120 executes a task of virus scanning, while the device node 124 executes a task of collecting accounting data.

Each task leader builds a task coverage comprising a plurality of device nodes. A device node controlled by the task leader is called an assigned device node for the task leader. For example, in the embodiment of the network architecture according to the invention as illustrated in FIG. 3, the task leader 120 includes a task coverage comprising seven device nodes 1210, 1220, 41, 42, 43, 44 and 45. The task leader 124 includes a task coverage comprising seven device nodes 1220, 1240, 1241, 1242, 46, 47 and 48 It is shown that some device nodes are within both coverages of task leaders 120 and 124. Such is allowable in the present invention, as a device node may perform two different tasks assigned from different task leaders and executable by a computer device.

In the embodiment of the network structure according to the invention as illustrated in FIG. 1, the task leader 120 is in the first layer of the network, and the sub-task leader 1210 is in the second layer of the network. It should be noted that the layer distribution is not confined by the practical topology of the network structure. For example, a virtual layer distribution is allowable in accordance with the invention. That is, it is possible that a device node practically located in the downstream of the network is in the upper layer of the task-based network structure. However, the distribution of the layers in accordance with the invention is based on the task requirement instead of the practical network structure. For example, if a task needs a powerful calculation ability, as the calculation ability of device node 1210 is more powerful than other device nodes in the network system (e.g., FIG. 1), the device node 1210 is assigned as a task leader of first layer which is directly controlled by the management server 108.

Figure 4:
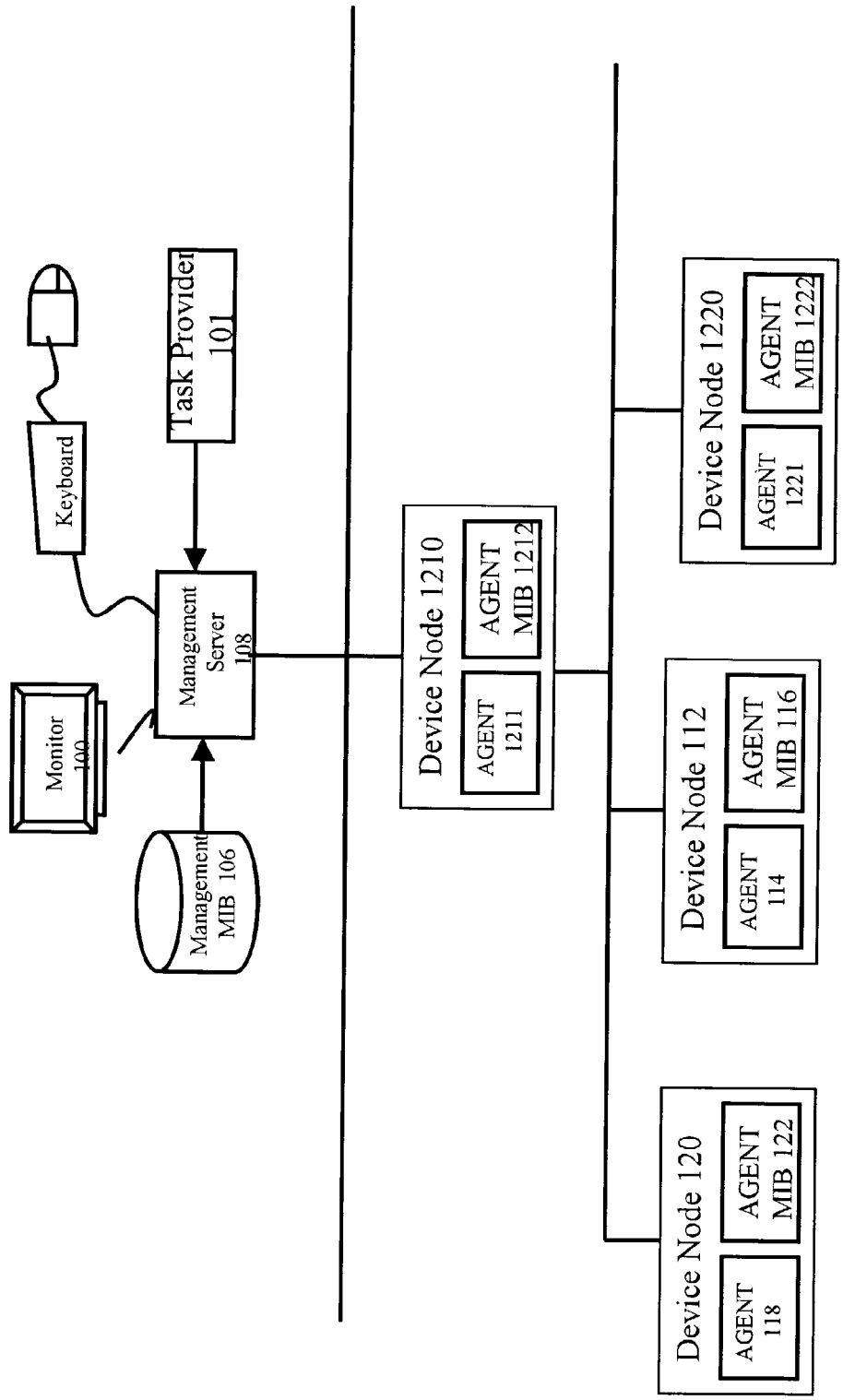
FIG. 4 is a schematic view virtual connection of a network based on the task leaders and the task coverage of the task leaders in an automatic network management system according to the invention.

The task leader 1210 may have a task coverage comprising device nodes 120, 112, and 1220 which are related to the task and controlled by the task leader 1210. In this particular embodiment of the network structure according to the invention, a virtual network can be depicted as that shown in FIG. 4. FIG. 4 shows the relationship of the device nodes 1210, 120, 112 and 1220 based on a task to be performed by the task leader 1210.

Each event is defined within a task leader selection base 321, as shown in FIG. 2. The task leader selection base includes the conditions for selecting task leaders, such as the operation speed of the microprocessor of the device nodes, the position of the device nodes in the network topology, etc. The task leader selection base 321 is stored in the event table. As an event occurs, the manager node 108 can determine the task leader based on the conditions listed on the event table. Similarly, the designation of sub-task leaders and other lower order task leaders in other lower layers has generally the same structure as the designation of the task leader. The conditions for selecting other lower-layer task leader are listed in the event tables. The event table authorizes the manager node 108 to designate lower layer task leaders, for example, sub-task leader 1210.

The task leader is designated in two ways, namely, dynamic designation and is static designation. In static designation, within an event executing period, a designation of a task leader remains generally the same as initially designated by the management server 108. In dynamic designation, a task leader is dynamically determined based on the characteristics of the event, including the location, timing, performance, network and system resources (for example, application software) of a device node, the position of a device node in the topology of the network, etc. In dynamic designation, the task leaders are changed dynamically in the task executing period. The selection of the static mode and dynamic mode is based on the event requirement. Of course, the network system can assign a mode based on at least the above considerations.

The MIB includes a cure database 340 having a plurality of cures capable of being performed by the system. The cures of the cure database can be initially stored in the MIB, or dynamically modified by the service provider 101. The service provider 101 also serves as a task provider. The cures in the cure database comprise a task. As an event occurs, a plurality of cures can be assembled to form a task so as to perform work in the network system. Alternatively, default tasks having a plurality of cures can be stored for performing management work in the network system. Work can be performed using a default task without needing to generate an additional task.

As mentioned above, tasks are classified as executing tasks 312 and control tasks 311 corresponding to work being performed in the network system. The control tasks 311 are sent to and stored in the task leaders. The task leader executing management work for the device nodes is consequently within the task coverage thereof. The executing tasks 312 are sent to the corresponding task leader and device nodes within the task coverage for performing management work based on cures in the task. In a like manner, the cures are classified into control cures 341 and executing cures 342. Control cures 341 are included in a control task 311, whereas executing cures 342 are included in an executing task 312. The control cure 341 defines an instruction for controlling other device nodes in the task coverage of the task leader or sub-task leader. The executing cure 342 defines an operation being performed by the device nodes.

The network architecture according to the invention further comprises a detecting feedback structure. In particular, agents connected to network 110 generate events or traps (generically referred to as "network alarms") in response to conditions which occur in the network resources with which they are associated, such as the infection of computer virus in application files. The network alarms are sent to the management server 108 which processes the alarms and generates events which are accident events. The network alarms have forms of cures which are prestored in the agent MIBs. Each network alarm includes a corresponding accident event. Thus, the management server 108 can advantageously adjust what accident event occurs according to the network alarm and accordingly execute a task.

The service provider 101 is a task provider that provides tasks or cures not available in the MIB 106 to the management server 108. The management server 108 then performs the task in response to a request from the task provider 106 or stores the task in the MIB 106. Similarly, the task provider 101 can send cures to the management server 108 which in turn stores the cures in the cure database 340, serving as an updating mechanism therefor. The task providers 101 can send new tasks or cures to the management server 108 by request or other predetermined arrangements.

Moreover, the MIB 106 can further include a task generator 330 that generates a task based on an event. That is, an event is cure-based and cure-defined. A task is generated using the cures related to the event by the task generator.

Figure 5:
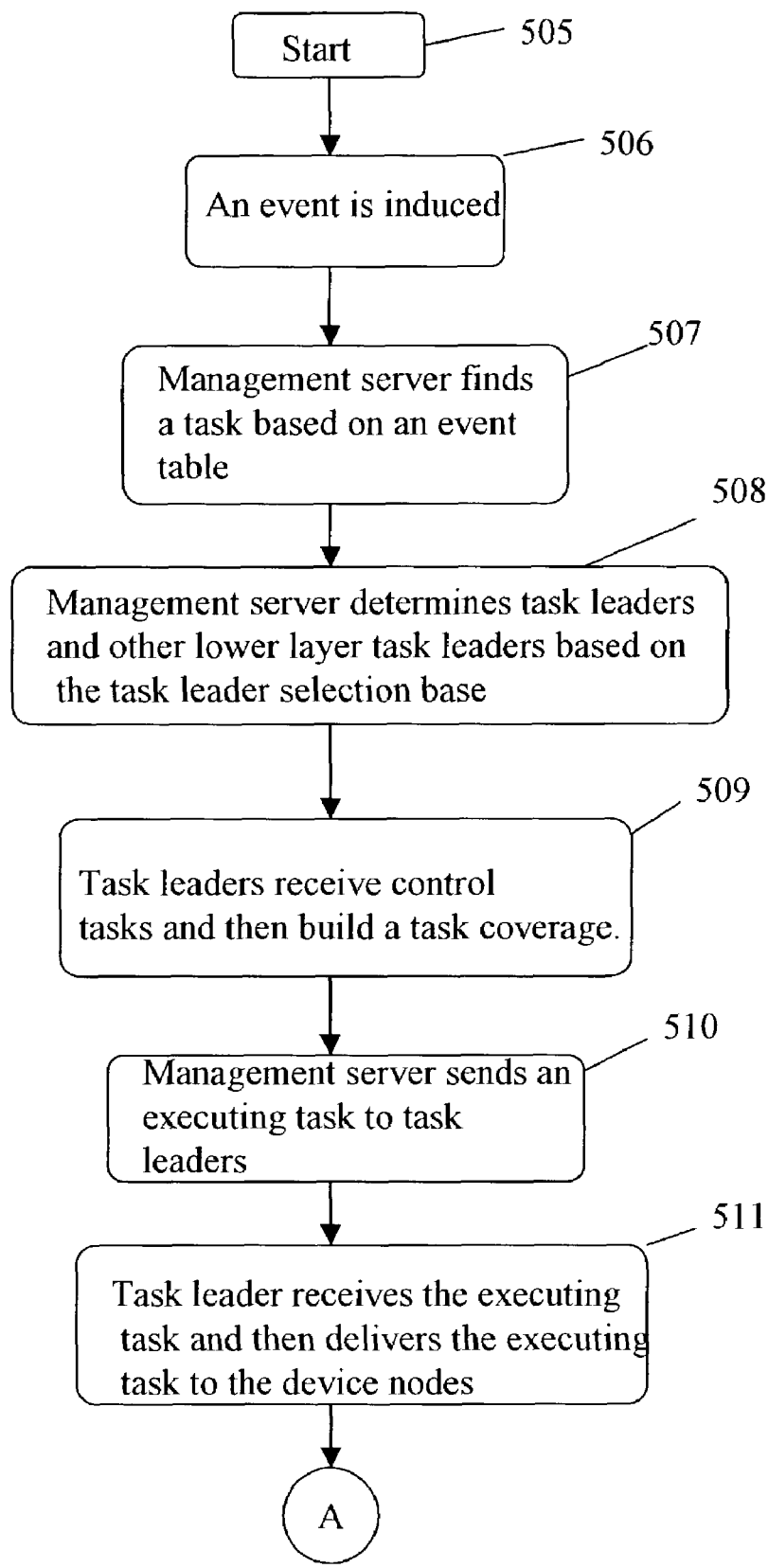
Figure 5:
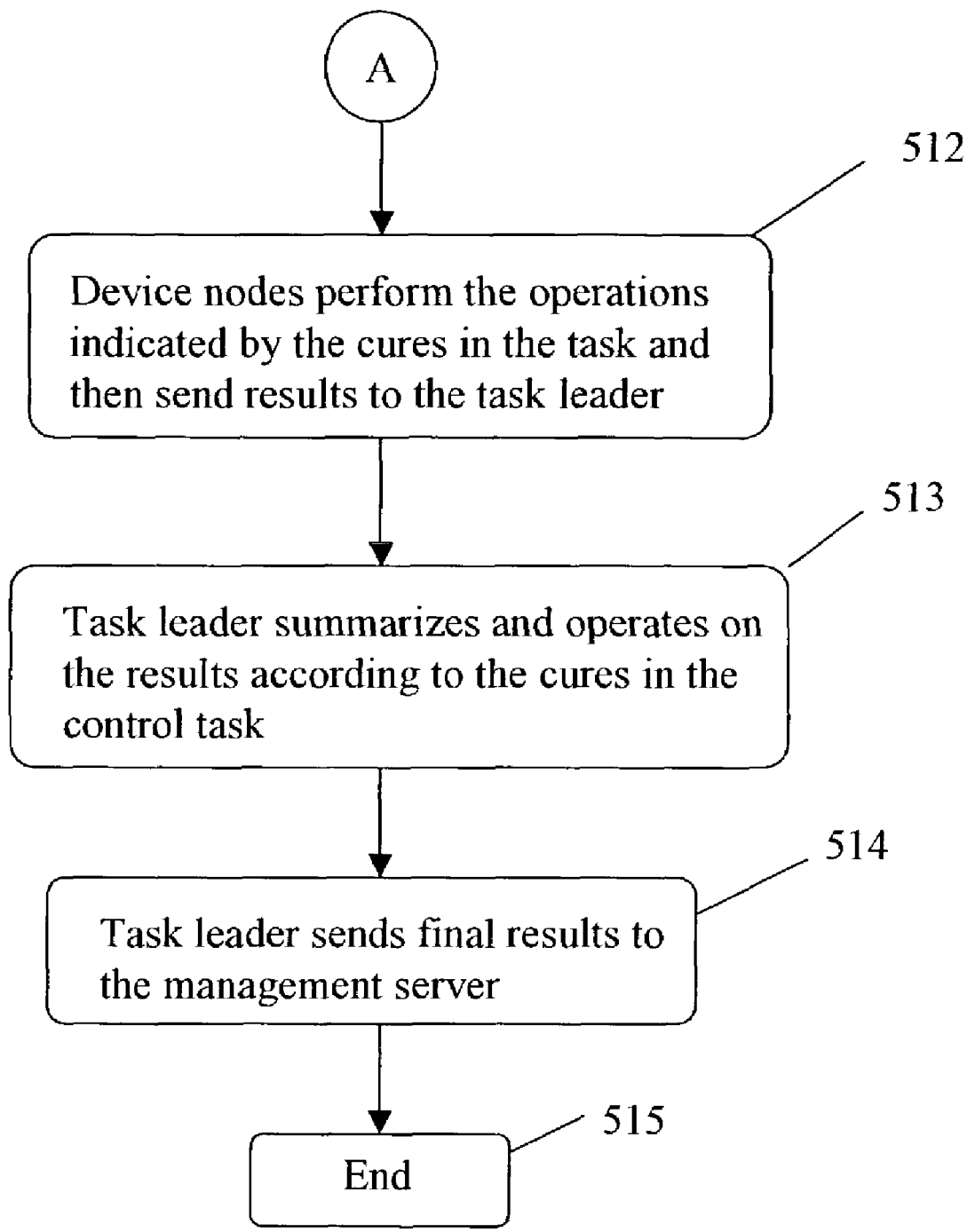

A preferred embodiment of the process for performing the present invention is described as follows with reference to FIGS. 5 and 5A. The process according to the invention starts from step 505. In step 506, an event is induced, which may be an accident event from the downstream device nodes, or an operator designating event, or a predetermined event in the network system. In step 507, the management server finds a task based on an event table of the event, the task containing an executing task and a control task corresponding to the executing task. In step 508, the management server determines and selects task leaders and other lower-layer task leaders (sub-task leaders or sub-sub task leaders, etc.) based on the task leader selection data base in the event table. Steps 507 and 508 are inter changeable, since these two steps are parallel steps. In the following step 509, the selected task leaders receive the control tasks and then build a task coverage forming a sub-net according to the control task. In step 510, the management server sends an executing task to the task leaders. In step 511, the task leader (or a plurality of task leaders) receives the executing task and then delivers the executing task to the device nodes in the task coverage. The control flow for the process according to the invention is directed to step A, which in turn is directed to step 512 of FIG. 5A. In step 512, the device nodes within the task coverage performs the operation instructed by the cures in the task and then send the results to the task leader. Into step 513, the task leader summarizes and operates on the results according to the cures in the control task. Finally, in step 514, the task leader sends the summarized results to the management server. The process comes to an end at step 515.

Figure 6:
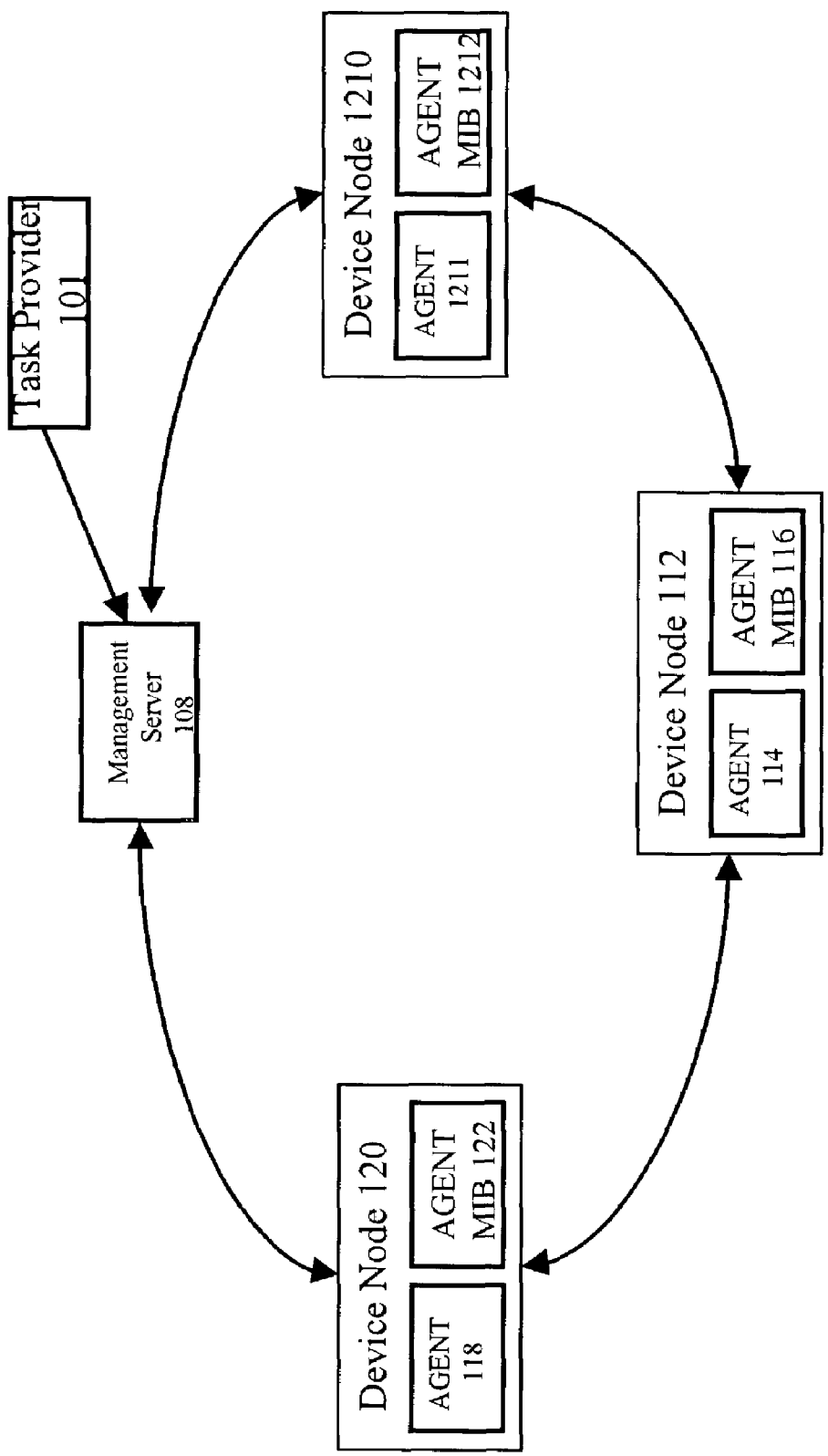
FIG. 6 is a schematic view illustrating a token ring connection for a network management system according to the invention.

Moreover, it should be noted that the present invention is not only suitable for the distributed network configuration illustrated in FIG. 1. Other configuration, such as token ring type connection in FIG. 6 or star-like connection or the combinations of above types are also within the scope of the present invention. The architecture of the present invention is based on a virtual connection built by the task leaders and the coverage thereof instead of the real connection of the network structure.

The present invention can be implemented by, for example, Java programming language which is a common object-oriented programming (OOP) language for cross-platform use. Java programs consist of bytecodes, which are architecture and operating-system-independent and can be sent over the Internet and other networks. The bytecode is actually executed on a particular platform by means of a virtual machine (VM) which allows a Java program to be run on any platform, regardless of whether the Java program was developed on, or for, the particular platform. Java bytecodes which arrive at the executing machine are interpreted and executed by the embedded VM. A complete Java program is known as an application, while a segment of Java code, which does not amount to a full application, but is reusable, is referred to as an applet. Java is well-suited to operation on various platforms, and for implementing the illustrative embodiment of the invention. However, the invention could be implemented for other OOP languages as well, e.g. C++.

The structure of the present invention is suitable for various kinds of networks, for example, Internet, Ethernet, local area network (LAN), wireless LAN, wide area network (WAN), etc.

The present invention is thus described hereinabove. It would be apparent to one skilled in the art that the invention can be embodied in various ways and implemented in many variations. Such variations are not to be regarded as a departure from the spirit and scope of the present invention. In particular, the process steps of the method according to the invention will include methods having substantially the same process steps as the method of the invention to achieve substantially the same result. Substitutions and modifications have been suggested in the foregoing detailed description, and others will occur to one of ordinary skill in the art. For example, various types of network systems can be utilized in conjunction with the automatic network management system according to the invention. All such modifications as would be obvious to one skilled in the art are intended to be included within the scope of the following claims and their equivalents.

I claim:

1. An automatic network management system comprising:
   a management server connected to a plurality of device nodes;
   a management information base (MIB) connected to said management server;
   a plurality of event tables stored in said MIB wherein each of said event tables corresponds to an event occurring in said network management system;

an event condition list listing conditions about each of said events for each of said event tables, wherein said conditions describe when one of said events occurs;

a plurality of tasks, each task corresponding to one of said events in one of said event tables and defining management work to be executed in said network management system, said management work including a series of operation steps; and a task leader selection database for selecting task leaders from at least one of said device nodes, wherein said task leaders are arranged for executing said tasks using said device nodes on behalf of said management server.

2. The system of claim 1 wherein said MIB further comprises a plurality of cures, each of said cures defining one of a plurality of executing items for completing said management work.

3. The system of claim 2 wherein said MIB further comprises a cure database storing said cures.

4. The system of claim 3 wherein said MIB further comprises a task generator for generating a task by selecting from said cures in said cure database based on said event occurring in said network management system.

5. The system of claim 4 wherein said MIB further comprises a plurality of tasks, each corresponding to said event in one of said event tables and defining said management work to be executed, wherein said tasks are classified as executing tasks and control tasks corresponding to said executing tasks, said control tasks are sent and stored in said task leaders, said executing tasks are sent to said task leaders and said device nodes within a task coverage corresponding to each of said task leaders for performing said generated task based on said selected cures.

6. The system of claim 3 wherein said cures are classified into control cures and executing cures, said control cures being included in a control task for controlling said device nodes in said task coverage corresponding to each of said task leaders, said executing cures defining an action being performed by said device nodes.

7. The system of claim 1 wherein each of said task leaders builds a task coverage including some or all of said device nodes under control of said task leader.

8. The system of claim 7 wherein said task leader designates a sub-task leader in said task coverage.

9. The system of claim 1 further comprising a task provider that provides tasks or cures not included in said MIB to said management server.

10. The system of claim 9 wherein said management server performs said management work in response to a request from said task provider.

11. The system of claim 1 wherein each of said event tables is defined within said task leader selection database having conditions for selecting said task leaders.

12. The system of claim 11 wherein said conditions are selected based upon operation speed of said device nodes, and position of said device nodes in a network topology of said network management system.

13. The system of claim 1 wherein each of said device nodes further comprises an agent for performing a task from said management server.

14. The system of claim 13 wherein each of said device nodes further comprises an agent MIB corresponding to said agent for storing said task performed by said agent.

15. The system of claim 1 wherein said task leaders are statically designated within an event executing period.

16. The system of claim 1 wherein said task leaders are dynamically designated within a task executing period.

17. The system of claim 1 wherein said task leaders are dynamically selected based on features of said event selected from a group consisting of location, speed, timing, performance, network resources, application software of said device nodes, position of said device nodes in a topology of said network system.

18. The system of claim 1 wherein said event is an event manually designated in said network management system.

19. The system of claim 1 wherein said tasks are classified as executing tasks and control tasks corresponding to said executing tasks, said control tasks are sent to and stored in said task leaders, said executing tasks are sent to said task leaders and said device nodes within a task coverage corresponding to each of said task leaders for executing said management work for said device nodes.

20. A method for automatically managing a network system comprising the steps of:

providing a management server connected to a plurality of device nodes;

connecting a management information base (MIB) to said management server;

storing a plurality of event tables in said MIB wherein each of said event tables corresponds to an event occurring in said network system;

listing conditions about each of said events in an event condition list for each of said event tables, wherein said conditions describe when one of said events occurs;

storing a plurality of tasks in said event tables, each task corresponding to one of said events in one of said event tables and defining management work to be executed in said network management system, said management work including a series of operation steps;

selecting task leaders in a task leader selection database from at least one of said device nodes; and executing said management work using said selected device nodes on behalf of said management server.

21. The method of claim 20 further comprising the steps of: providing a plurality of cures; and defining one of a plurality of executing items using each of said cures for executing said management work.

22. The method of claim 21 further comprising the steps of providing a cure database in said MIB and storing said cures in said cure database.

23. The method of claim 22 further comprising the step of generating a task by selecting from said cures in said cure database based on said event occurring in said network system.

24. The method of claim 23 further comprising the steps of:

providing a plurality of tasks in said MIB, each of said tasks corresponding to said event in one of said event tables and defining said management work to be executed, classifying said tasks as executing tasks and control tasks corresponding to said executing tasks;

sending and storing said control tasks in said task leaders;

sending said executing tasks to said task leaders and said device nodes within a task coverage corresponding to each of said task leaders for performing said generated task based on said selected cures.

25. The method of claim 22 further comprising the steps of: classifying said cures into control cures and executing cures; including said control cures in a control task;

controlling said device nodes in a task coverage corresponding to each of said task leaders; and defining an action being performed by said device nodes using said executing cures.

26. The method of claim 20 further comprising the step of building a task coverage including some or all of said device nodes for each of said task leaders.

27. The method of claim 26 further comprising the step of designating a sub-task leader in said task coverage.

28. The method of claim 20 further comprising the step of providing a task provider that provides tasks or cures not included in said MIB to said management server.

29. The method of claim 28 wherein said management server performs said management work in response to a request from said task provider.

30. The method of claim 20 further comprising the step of defining each of said event tables within said task leader selection database having conditions for selecting said task leaders.

31. The method of claim 30 further comprising the step of selecting said conditions from the group consisting of operation speed of said device nodes, and position of said device nodes in a network topology of said network system.

32. The method of claim 20 further comprising the step of:
providing an agent in each of said device nodes for performing a task from said management server.

33. The method of claim 32 further comprising the step of providing an agent MIB corresponding to said agent for storing said task performed by said agent.

34. The method of claim 20 further comprising the step of statically designating said task leaders within an event executing period.

35. The method of claim 20 further comprising the step of dynamically designating said task leaders within a task executing period.

36. The method of claim 20 further comprising the step of dynamically designating said task leaders based on features of said event selected from a group consisting of location, speed, timing, performance, network resources, application software of said device nodes, position of said device nodes in a topology of said network system.

37. The method of claim 20 wherein said event is manually designated.

38. The method of claim 20 further comprising the steps of:

classifying said tasks as executing tasks and control tasks corresponding to said executing tasks;

sending and storing said control taskes in said task leaders; and sending said executing tasks to said task leaders and said device nodes within a task coverage corresponding to each of said task leaders for executing said management work.

* * * * *